United States Patent
McFarland et al.

[15] 3,670,419
[45] June 20, 1972

[54] RUN OUT INDICATOR FOR DISC BRAKE

[72] Inventors: Frederick R. McFarland; Walter L. Diffenderfer, both of Lancaster, Pa.

[73] Assignee: K-D Manufacturing Company, Lancaster, Pa.

[22] Filed: May 5, 1971

[21] Appl. No.: 140,383

Related U.S. Application Data

[63] Continuation of Ser. No. 840,706, July 10, 1969, abandoned.

[52] U.S. Cl. ............................................. 33/172 B
[51] Int. Cl. ................................. G01b 3/22, G01b 5/00
[58] Field of Search .................... 33/172 B, 172 A, 148 H

[56] References Cited

UNITED STATES PATENTS

| | | | |
|---|---|---|---|
| 1,139,936 | 5/1915 | Warner | 33/172 |
| 1,436,111 | 11/1922 | Reich | 33/172 |
| 1,964,168 | 6/1934 | Lowe | 33/172 |
| 2,091,376 | 8/1937 | Reich | 33/172 |
| 2,322,278 | 6/1943 | Buckwalter | 33/172 |
| 2,665,658 | 1/1954 | Welch | 33/172 |

FOREIGN PATENTS OR APPLICATIONS

| | | | |
|---|---|---|---|
| 603,608 | 10/1934 | Germany | 33/174 |
| 574,225 | 12/1946 | Great Britain | 33/172 |

OTHER PUBLICATIONS

"Popular Mechanics" Feb. 1944 p. 137, Russell Rosendahl

Primary Examiner—Leonard Forman
Assistant Examiner—A. J. Mirabito
Attorney—Paul & Paul

[57] ABSTRACT

An indicator is adjustably mounted on a vertical support rising from a heavy base. Adjustment means are provided on the base for pivotally moving it in a vertical plane once it is positioned, to position the indicator with respect to the surface of a disc brake rotor. Through pivoted arms the indicator senses the run out of the rotor, as it is rotated, and indicates readings on a scale.

1 Claim, 4 Drawing Figures

PATENTED JUN 20 1972

INVENTORS.
Frederick R. McFarland
BY Walter L. Diffenderfer

Paul & Paul
ATTORNEYS.

INVENTORS.
Frederick R. McFarland
BY Walter L. Diffenderfer

*Paul & Paul*
ATTORNEYS.

RUN OUT INDICATOR FOR DISC BRAKE

CROSS REFERENCE TO RELATED APPLICATION

This application is a continuation of our prior copending application for a Run Out Indicator for Disc Brake, Ser. No. 840,706, filed: July 10, 1969, and now abandoned and discloses and claims the subject matter in that application.

BACKGROUND OF THE INVENTION

This invention relates to an indicator for measuring the run out of the rotor of a disc brake. The device is particularly useful for measuring the run out on a rotor which is already mounted on an automobile.

Disc brakes used on automobiles comprise a rotor mounted to a shaft which turns between a pair of shoes disposed about the opposite faces of the disc or rotor. Fluid pressure exerts force on pistons to press the linings of the shoes against the rotor faces. These faces must be true, flat and accurate and properly mounted in order to function properly with the shoes. Just as in conventional brakes, these surfaces must be periodically inspected for safety reasons and many states are now requiring such inspections.

It is desirable to provide a gauge which is simple to use, which may be readily operated by a mechanic to give an accurate determination of the run out of the surface of the rotor, and which is particularly adapted to field operations wherein the brakes are tested while mounted on actual automobiles.

SUMMARY OF THE INVENTION

This invention comprises an indicator mounted to a support extending from a base, the whole being readily movable and stable when placed in an upright position, and said base having means associated therewith to pivotally adjust it through a vertical plane to a plurality of fixed positions. The indicator comprises a plurality of pivotally mounted levers which coact with one another in response to movement of a sensor to indicate readings from which the run out of the brake rotor can be calculated.

Accordingly, it is an object of this invention to provide an accurate manual gauge for indicating the run out of the rotor of a disc brake mounted on an automobile.

This and other objects of this invention will become apparent from the following description with reference to the accompanying drawings.

DESCRIPTION OF THE PREFERRED EMBODIMENTS

Figure 1:
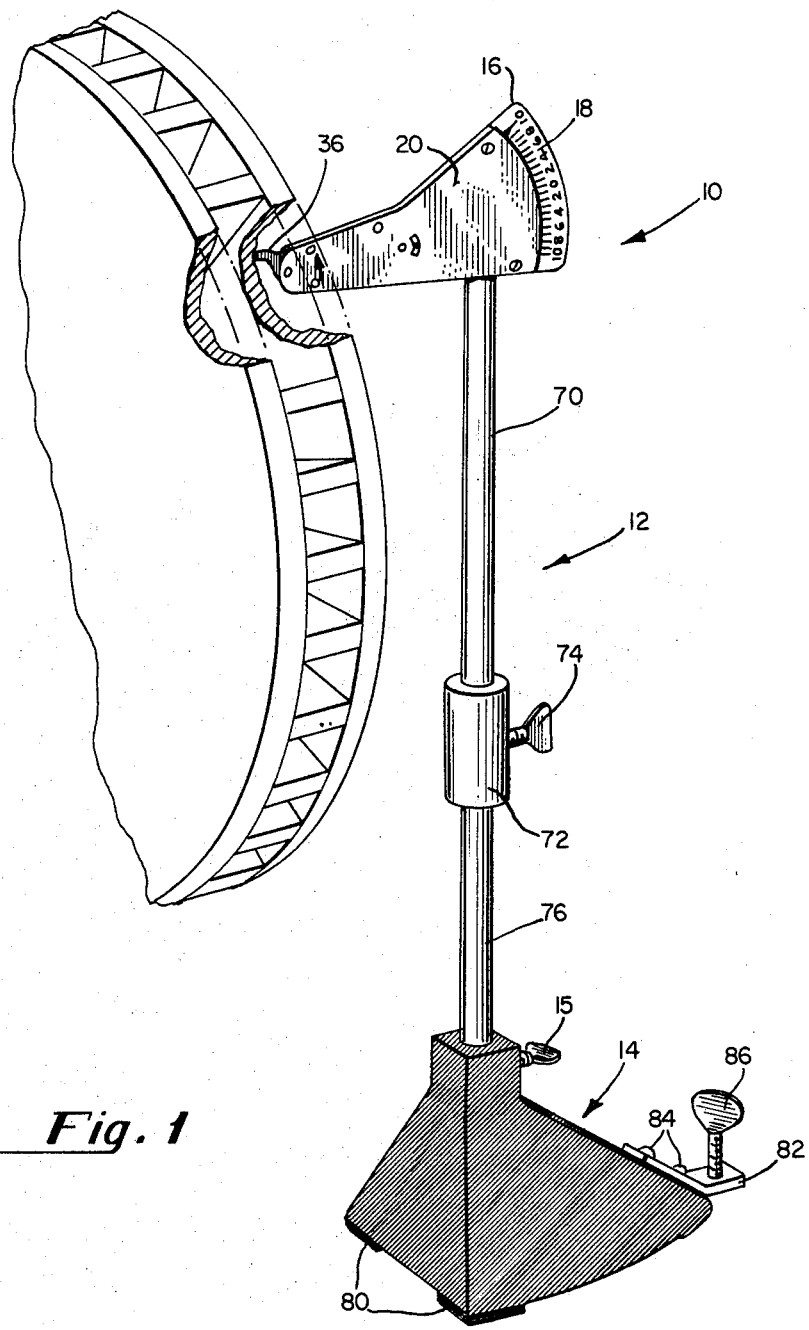
FIG. 1 is a perspective view of the preferred embodiment of this invention shown in operative relation to a disc brake rotor.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, the indicator assembly shown comprises an indicator designated generally 10, a support designated generally 12 and a base designated generally 14. The support and base perform the dual functions of mounting and adjusting the indicator as will be more fully explained hereinafter.

Figure 2:
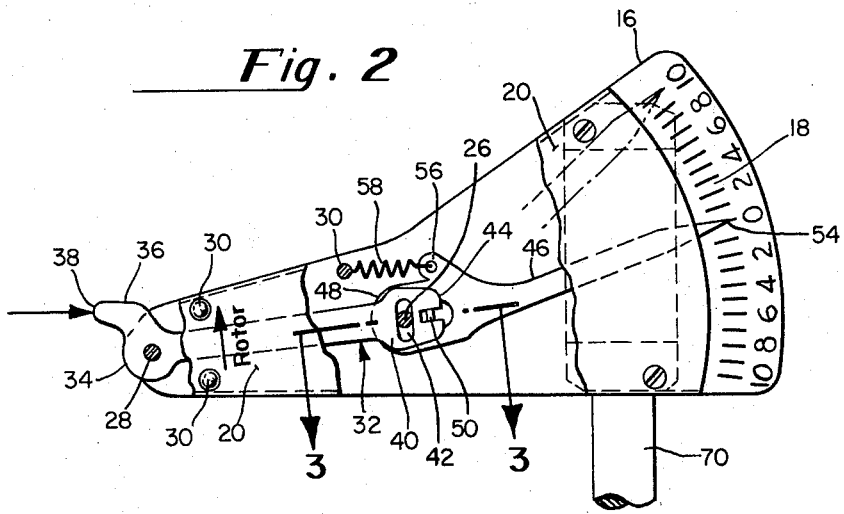
FIG. 2 is a side view of a portion of the invention shown in FIG. 1 partially broken away for the sake of clarity and showing alternate positions in phantom.
Figure 3:
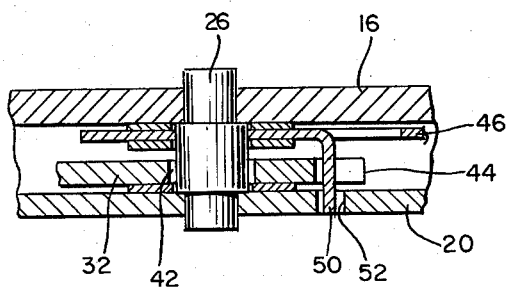
FIG. 3 is a section taken as indicated by the lines and arrows 3—3 in FIG. 2.

The indicator FIG. 2 comprises a body 16 which includes a flat arcuate portion having indicia forming a scale 18 thereon along the arcuate edge thereof. The scale is incremented to give readings in units of 0.001 inches from a centrally disposed reading at 0 to a maximum reading of 10 such units at either extremity of the arc. This scale was designed for use with common rotors for disc brakes now being used in the automotive industry. Of course, it is to be understood that the scale could be varied if necessary within the scope of this invention.

Spaced from the body is a cover 20 which has further indicia thereon in the form on an arrow 22 and lettering indicating the direction in which the rotor is to be turned. The cover fits over and mates with the base and is spaced therefrom by bushings 24 and internal studs 26 and 28 and is fixedly attached thereto by means of rivets 30. Within the space or envelope provided there are a plurality of levers and a spring which function to sense and indicate the readings made by the device.

The sensor and drive lever 32 comprises a hub 34 which is pivotally mounted about the stud 28 between washers which space it from the body and cover. Extending outwardly from the hub is a finger 36. The rounded terminal portion 38 is utilized as a sensor for the device. The finger is offset from the axis of rotation or pivot point of the hub. At the other end of the lever 32 is a head 40 having an elongated slot 42 therein and terminating in a yoke 44. The elongated slot 42 clears the sides of the stud 26 by a few thousandths of an inch so that the lever 32, when it is pivoted, can swing on an arcuate path back and forth until the stud engages either end of the slot. It will be apparent from what has been said thus far, that when a force is exerted longitudinally against the rounded end 38 in the direction of the arrow the lever will be caused to be pivoted clockwise when viewed as in FIG. 2 about the stud 28.

Also disposed between the body and cover is an indicator arm 46 having a hub 48 pivotally mounted on the stud 26. A tab 50 extends from the face of the hub and is embraced by the yoke 44 on the lever 32. The tab extends through an arcuate slot 52 in the cover. It will be apparent from what has been thus far described that upon movement of the lever 32, as just described, the yoke 44 will cause a corresponding pivotal movement of the indicator arm 46 about its pivot point, that is the axis of the stud 26, in a clockwise direction when viewed as in FIG. 2. Accordingly, since the position of the tab 50 on the hub 48 of the indicator arm 46 will determine the position of the arm 46 as it is moved by the yoke 44, it follows that bending of this tab will adjust the position of the arm. This bending can be done after assembly, since the tab extends through the slot 52 in the cover. As will be apparent to one skilled in the art the bending of the tab is useful in adjusting the indicator arm to zero.

The other end of the indicator arm has a pointer 54 which overlies the scale 18. The pointer thus indicates at any given movement some reading on the scale. A tab 56 extends from the hub and is engaged by one end of a spring 58; the other end of which is fixedly connected to a rivet passing through and engaging the body and cover. The spring is constantly under tension so that the pointer is normally fully rotated in a counterclockwise direction to a position at the end of the scale as shown in phantom FIG. 2.

Figure 4:
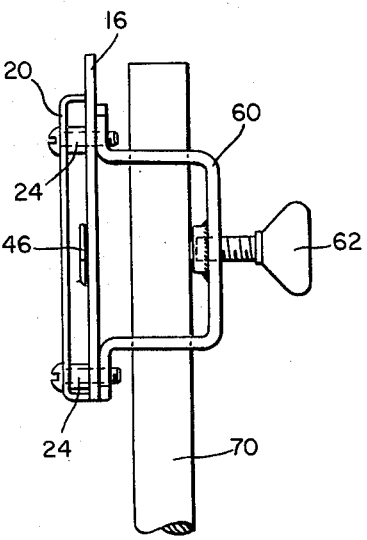
FIG. 4 is a partial end view of the apparatus shown in FIG. 1.

As shown in FIG. 4 a mounting bracket 60 is fixedly attached to the body by any suitable means such as machine screws. The mounting bracket is U-shaped with flanges at the ends of the U for attaching it to the body. Each leg of the U has a hole therethrough for reception of the upright support bar 70. A thumb screw 62 is threaded through the base of the U-shaped frame 60 to engage the support bar 70. It will be apparent from what has been said that the indicator device can be vertically positioned to a plurality of fixed positions along the upper support bar by means of loosening the thumb screw and tightening it when the desired fixed position has been reached.

Additionally, the support 12 can be provided with a cylindrical coupling 72 and a thumb screw 74 passing therethrough. One or more of such couplings threaded to additional bars such as 76 can be provided for purposes of making the devices adaptable to varying heights. The lower most bar 76 fits in a cylindrical hole in the base 14 and is retained therein by means of the thumb screw 15 which is threaded through the base. The base is preferably a heavy cast iron body to lend weight and rigidity to the unit. The front of the body is supported at two points on pads 80. The third point of support for the base is equally spaced from the front pads. This support consists of a rearwardly extending flange 82 which is fixedly attached to the body of the base in any suitable fashion as by machine screws 84. Passing through the tab and in threaded engagement therewith is a thumb screw 86 which preferably has a conical point downwardly extending therefrom. By turning a thumb screw in a clockwise direction when viewed from above, the screw travels through the tab and engages the surface upon which the base is resting. As the screw is turned further the rear of the base is raised thereby pivoting the entire base in a vertical plane about the front pads 80. Note that the pads lie in front of the axis of the support rod to lend stability to the unit.

OPERATION

In operation a mechanic will check the original manufacturer's specification for the allowable rotor run out. After removing the wheel of the automobile, the mechanic will position the entire unit next to the outwardly disposed face of the rotor as shown in the perspective view of FIG. 1, with the sensor 38 just touching the face of the rotor. The height of the support rod can be adjusted by moving it up and down within the base and the height of the indicating device itself can be adjusted by moving it up and down on the upper bar as previously described.

Next, the thumb screw 86 is turned thereby tilting the entire unit in a vertical plane. This has the effect of exerting a pressure or force against the rounded sensor 38 which causes the lever and indicator arms to rotate clockwise as previously described. Thus the indicator arm will move from its position at 10 on the scale as the thumb screw is turned clockwise. Further adjustment should be made until the pointer 54 overlies the zero indication on the scale.

With a piece of chalk or crayon, the mechanic will mark the starting spot on the disc brake rotor. Then he will turn the rotor carefully and slowly in the direction shown by the arrow 22 on the face of the cover. While so turning the rotor the mechanic will watch the movement of the indicator pointer and after a complete revolution of the rotor he will add the number of scale lines that the needle moves on each side of the zero line. This will give the full amount of run out. To make sure that the reading is accurate and no lost motion occurred, the indicator should stop at the zero starting point after one complete rotor revolution. It is only necessary to indicate the run out of the outside of the disc brake rotor.

It will be understood that various changes in the details, material s and arrangement of parts which have been herein described and illustrated in order to explain the nature of this invention, may be made by those skilled in the art within the principle and scope of the invention as expressed in the following claims.

IN particular it is possible to mount the indicator portion of the device in a horizontal rather than a vertical plane, as for example by welding a horizontally extending bar to the upwardly extending vertical bar 70 of the support at an angle of 90 degrees thereto. The bracket 60 could then be inserted over the horizontally extending bar and the thumb screw 62 tightened to fix the indicating device in position.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:
1. A run out indicator for disc brakes, comprising:
   a. an adjustably movable base supporting an indicator means for movement toward and away from the radial surface of a disc brake;
   b. said indicator means comprising:
      1. a body including an elongated sensor having a rounded terminal surface for engaging the radial surface of the disc brake, said sensor extending from a pivotally mounted arm portion of said body and being offset from the pivot point thereof, said body extending longitudinally from said arm portion in the opposite direction from said elongated sensor, said longitudinally extending portion of said body terminating in a yoke;
      2. a pointer pivotally mounted at one end and having a tab extending therefrom through said yoke whereby on pivotal movement of said body said yoke will engage said tab and move said pointer about its pivot;
      3. a plurality of plates including a backing plate fixedly connected to a cover plate, said backing plate having pivotally mounted thereto said body and said pointer and having indicia disposed along one arcuate face thereof in an arc, the free end of said pointer overlying said indicia and cooperating with said indicia for indicating measurements; said cover plate overlying and, together said backing plate, enclosing said arm and longitudinally extending portion of said body and the portion of said pointer having said tab extending therefrom; said cover plate having a slot therein through which said tab extends; and
      4. a spring attached at one end to said pointer and at the other end to said body to urge said pointer to pivot about its pivot point in a predetermined direction;
   c. said indicator means being positioned to cooperate with said radial surface of said disc brake to indicate the run out thereof when said brake is rotated, and being positioned with respect thereto such that the elongated sensor and its rounded terminal surface are offset from the pivot arm portion downstream in the direction of rotation of the brake when said brake is rotated for measuring its run out.

* * * * *